June 6, 1944. J. R. CORNELIUS 2,350,877
MULTI-POINT LUBRICATION
Filed Nov. 23, 1942

Inventor
James R. Cornelius
By Babcock & Babcock
Attorneys

Patented June 6, 1944

2,350,877

UNITED STATES PATENT OFFICE 2,350,877

MULTIPOINT LUBRICATION

James Richard Cornelius, Haseley Knob, near Warwick, England

Application November 23, 1942, Serial No. 466,630
In Great Britain August 14, 1942

1 Claim. (Cl. 184—7)

This invention relates to multi-point lubrication as employed for machine tools and in all cases where pre-determined quantities of lubricant are required to be delivered at a plurality of points.

Whilst being more or less efficient for a given number of points most lubrication systems of this kind as are at present in use have the disadvantage that they cannot easily be extended to include additional points without expensive elaboration. Another defect of present systems is that the regulation of supply of lubricant to any point is open to interference and that any such interference often has the effect of upsetting the whole system with the result that some points are flooded whilst others are starved, waste in the one case and seizure of rotating parts in the other case being the inevitable result.

One of the objects of the present invention is to provide a system of multi-point lubrication which can be readily extended to include additional points without in any way affecting the original efficiency of the installation.

A further object of the invention is to provide a system of lubrication of the kind herein referred to which when once assembled is proof against any unauthorized interference at any point.

The invention consists in a system of lubrication in which there is provided in the main pipe line one or more enclosed metering devices arranged for automatic operation and adapted to deliver intermittent and pre-determined quantities of lubricant to any desired number of points.

Each device comprises an enclosed casing having inlet and outlet orifices for connection with the main pipe line, and one or more toothed pinions rotatably mounted therein and adapted as they rotate to establish intermittent communication with one or more delivery orifices adapted for connection with the point or points requiring lubrication.

For this purpose one or each of the pinions is formed with a hole or passage open at the periphery of the pinion and communicating with an exit connection of the device.

The pinions are arranged for rotation by the supply pressure of the lubricant passing through the main pipe line from a pump and are entirely enclosed in the casing so that they cannot be tampered with by any unauthorized person.

In the accompanying drawing.

Figure 1:
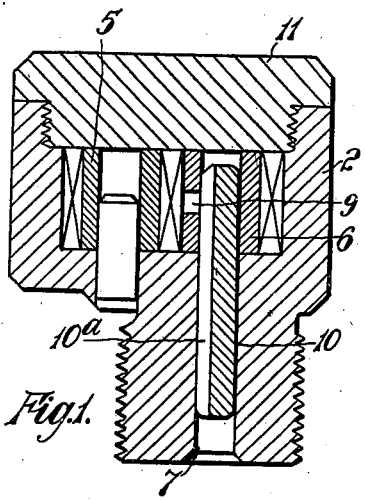
Figure 1 is a view in axial plane section of one form of the improved metering device.

Referring to the drawing, the improved metering device comprises an enclosed casing 2 having inlet and outlet orifices 3, 4 for connection with a main pipe line 1, and a pair of toothed pinions rotatably mounted in said casing and adapted to establish intermittent communication between said inlet orifice 3 and one or more delivery orifices 7 connected with the point or points requiring lubrication.

Figure 2:
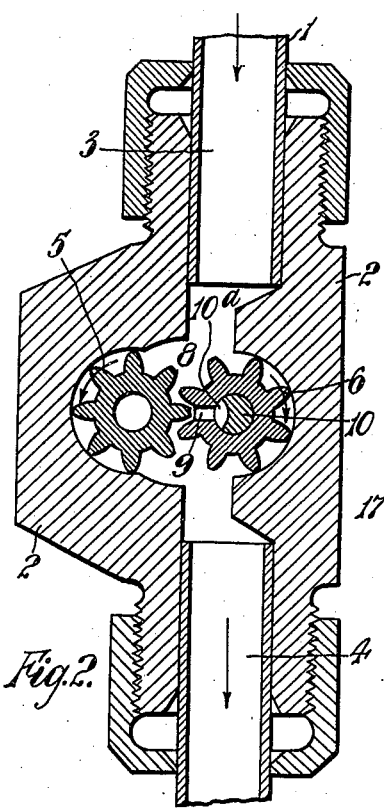
Figure 2 is a sectional plan view thereof.

The two pinions are arranged in a chamber 8 in the casing by which they are closely enveloped for such a length of their circumference as may be considered expedient for the condition or quantity of lubricant that may be required to be delivered intermittently through the orifice 7. In the form shown in Figures 1 and 2 the pinion 6 is hollow and has a lateral hole 9 opening at the periphery of the pinion between a pair of teeth. The said pinion is rotatably mounted on a pin 10 which is formed with a longitudinal groove 10a connecting at different periods the hole 9 with the delivery orifice 7 which, as shown is formed by a screwed extension of the casing and is adapted for connection with the gallery through which the lubricant has to be ejected to reach the bearing to be lubricated. The spaces between the teeth of the pinions are closed at the bottom by the base of the chamber 8 and at the top by means of a screwed cap 11 thereby preventing any escape of lubricant from the chamber otherwise than by way of the spaces between the teeth as the pinions rotate.

The pinions are rotated by the supply pressure of the lubricant. The lubricant entering the casing at 3 under pressure, and passing from the casing at 4 as indicated by arrows in Fig. 2 causes the pinion 6 to rotate in a clockwise direction and the pinion 5 in an anti-clockwise direction as indicated by arrows in Fig. 2. At each revolution of the pinion 6 the hole 9 will become exposed for a predetermined interval to the incoming lubricant and permit a certain quantity to escape by way of the groove in the pin 10 through the delivery orifice 7 whence it will be fed either by gravity or under pressure to the point requiring lubrication. The amount thus intermittently delivered will be determined by the number and diameter of the holes 9, the speed of rotation of the pinion 6 and the degree to which the latter is enveloped by the casing, all of any of which factors can be varied as desired. The remainder of the lubricant will be carried by the spaces between the teeth of the pinions to the main outlet 4.

Figure 3:
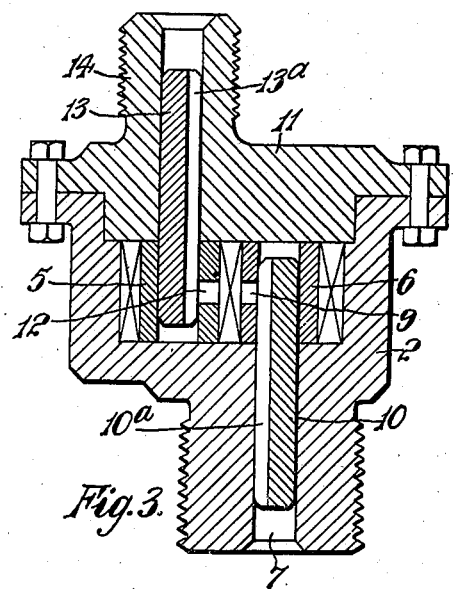
Figure 3 is a view similar to Figure 1 illustrating a modification.

Provided suitable provision is made for preventing escape of lubricant otherwise than by the spaces between the teeth, the device can be adapted to give more than one intermittent feed. For example, as shown in Figure 3, the pinion 5 may be formed with a lateral hole 12 in a similar manner to pinion 6 in which case pinion 5 is also rotatably mounted on a pin 13 having a longitudinal groove 13$^a$ opening to a screwed extension 14 provided on the cap 11 for connection with the additional point requiring lubrication. In this case the cap will spigot into the casing and can be bolted down as shown or otherwise secured in position.

Figure 4:
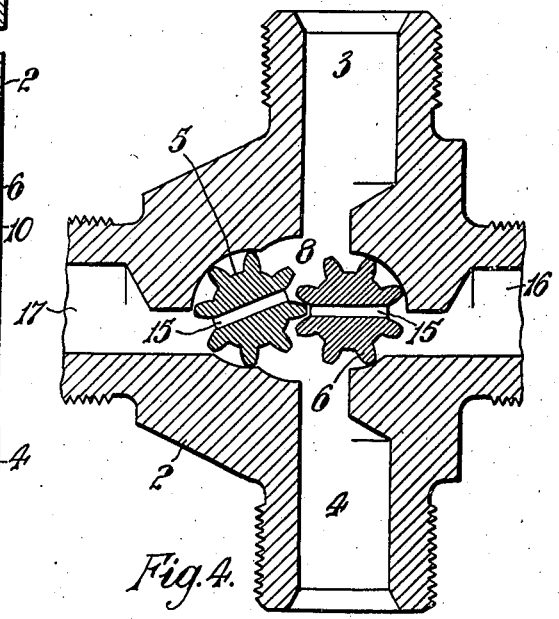
Figure 4 is a view similar to Figure 2 illustrating a further modification.

Alternatively, as shown in Figure 4, a hole 15 may be formed right through each of the pinions 5, 6 to establish intermittent communication with lateral extensions 16, 17 similar to and in the same plane as 3 and 4, thus permitting a plurality of points to be fed from the one device, each extension being connected by a pipe with the bearing requiring lubrication. If desired, there may be more than one hole 15 through each pinion.

Any desired number of devices similar to those above described can be arranged in series or in parallel in the same pipe line according to the number of points requiring lubrication and means, such as a cock, may be provided for switching any one or more of said devices into and out of action as desired.

I claim:

A metering device for supplying oil or lubricant to parts to be lubricated and for use in a system of multi-point lubrication which includes a main pipe line connected with a source of supply of lubricant under pressure and carrying lubricant to a number of different points and through a number of metering devices, said metering device comprising a casing to be interposed in said pipe line and having a metering chamber, an inlet passage leading from said pipe line to said metering chamber, an outlet passage leading from said metering chamber to the said pipe line, and a pair of metering gear pinions in constant mesh and rotated in said chamber by said lubricant moving under pressure, whereby the lubricant will pass without interruption through the pipe line and a metering device interposed therein, said metering device having at least one lateral delivery duct to be connected with a point to be lubricated, and one of said pinions having a passage opening at the periphery thereof and intermittently establishing communication between the interior of said chamber and said delivery duct once during each rotation of said pinion, whereby the lubricant will be forced by the pressure to which it is subject through said pinion into and through said delivery duct throughout the period of each such intermittent communication.

JAMES R. CORNELIUS.